UNITED STATES PATENT OFFICE.

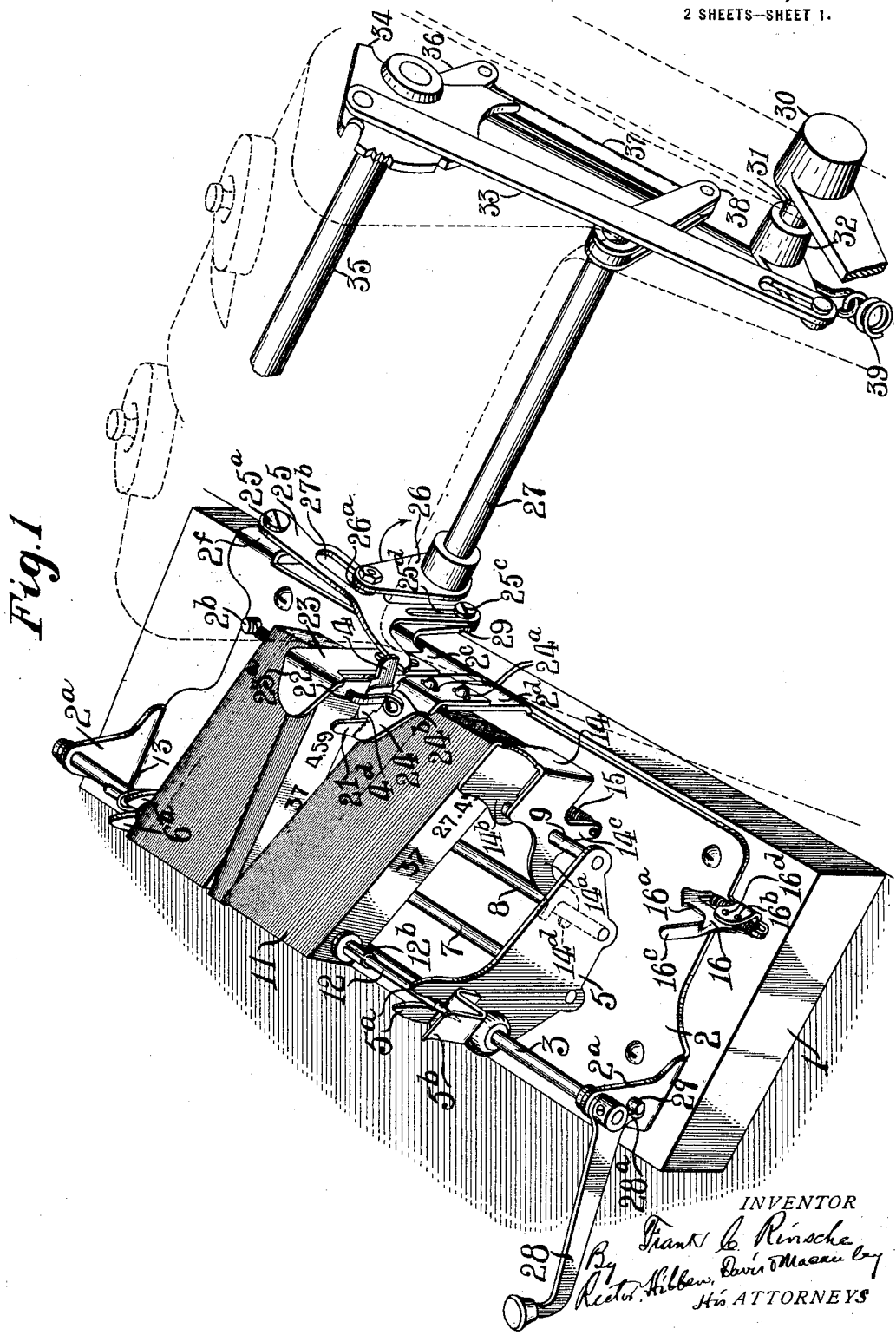

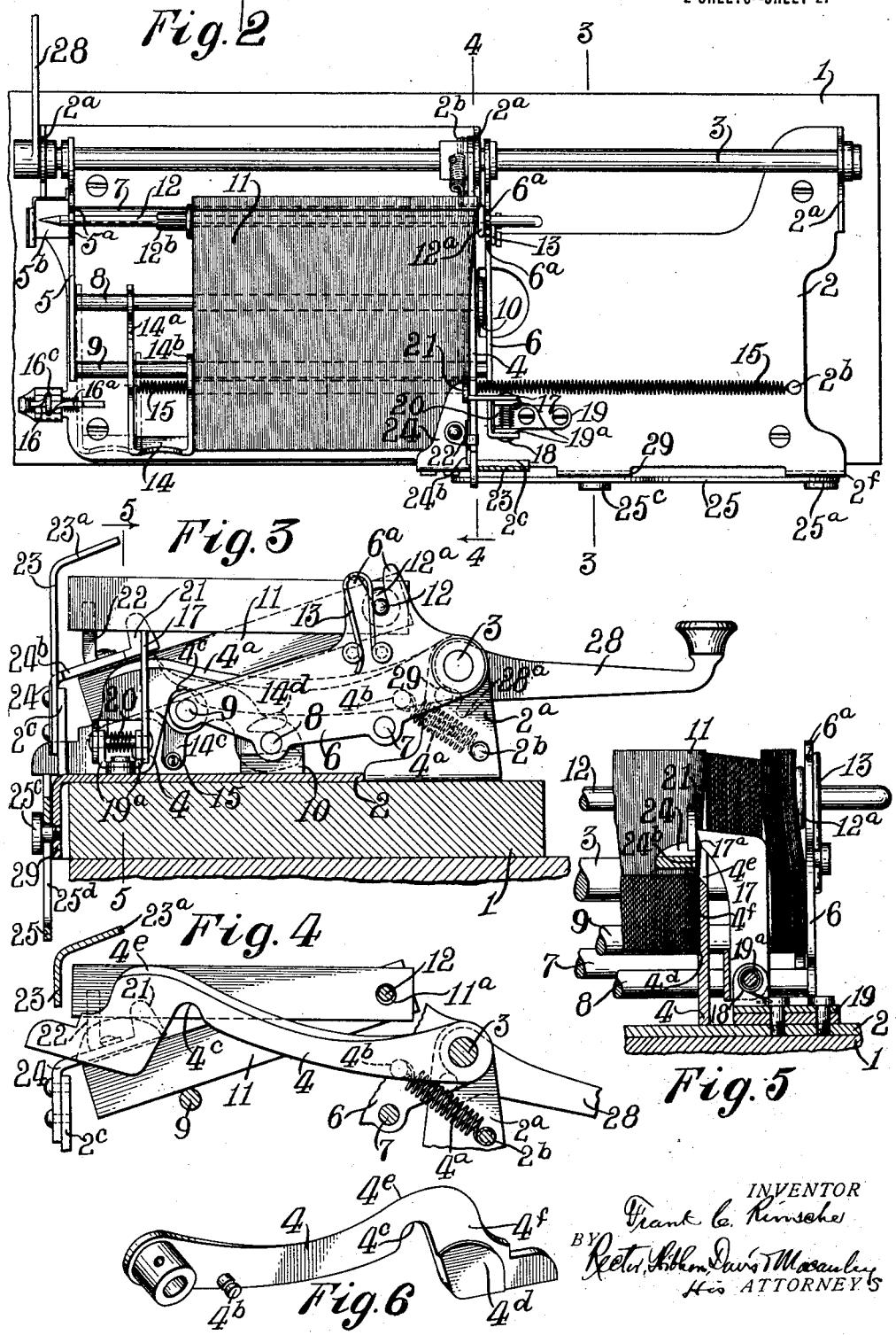

FRANK C. RINSCHE, OF DETROIT, MICHIGAN, ASSIGNOR TO BURROUGHS ADDING MACHINE COMPANY, OF DETROIT, MICHIGAN, A CORPORATION OF MICHIGAN.

DEVICE FOR DISPLAYING CARDS.

1,399,444.　　　　Specification of Letters Patent.　　Patented Dec. 6, 1921.

Application filed April 24, 1919. Serial No. 292,399.

*To all whom it may concern:*

Be it known that I, FRANK C. RINSCHE, a citizen of the United States, residing at Detroit, in the county of Wayne and State of Michigan, have invented certain new and useful Improvements in Devices for Displaying Cards, of which the following is a specification.

My invention relates to a device by means of which cards arranged in a block or stack are consecutively elevated in such manner that a portion of each successive card, bearing printed matter, will be elevated into position to be visible to the operator. The device is particularly adapted for use in connection with an adding machine, and preferably is arranged to be operated in synchronism therewith through suitable connections with an operating shaft of the adding machine mechanism, although if desired it may be operated manually through a hand lever, as will be hereinafter more fully explained.

In department stores, mail order houses, and other business concerns, it is often desirable to know at the end of each day, or other period of time, the total amount of transactions of each of a number of different departments. Thus, in a department store, it may be desirable to know the total amount of sales of each department; in a mail order house it may be desired to know the total sales to customers in each State into which the business of the house extends; and in manufacturing plants it may be a distinct advantage to know the time or cost of various jobs, or the expense of each of the various departments of the establishment.

My invention is primarily designed to facilitate the listing of segregated groups of entries such as those above mentioned, and the object of my invention is the production of a mechanical device, efficient and reliable in action, which will display *seriatim* the cards of a block or stack of segregated cards upon which the items are entered, either manually by operation of a handle, or as an incident to the operation of an adding machine, through the provision of suitable connections.

In carrying out this work for which my machine is more particularly designed, it will be understood that a complete record of all transactions is first made upon a strip of paper or light card board of sufficient thickness to be cut into suitable cards for the purpose, each entry bearing in addition to the sale price, or other data, a code number indicating the department or locality, as the particular purpose may require. This strip is cut into cards midway between the items, and if the strip is not already perforated the separate cards are punched at the end of each card remote from the printed matter, usually centrally of its width, though this may be varied.

The individual cards are then segregated according to the code numbers into groups or stacks representing the different departments, etc., covered by the record, and the different stacks arranged upon pins to be inserted in the device. By the operation of the device whether manually or through a connection with the adding machine mechanism, the cards of any one group may then be successively displayed, and the amounts shown thereon are listed on the adding machine, giving the desired total for that department.

It will readily be seen that the automatic operation of the device through a connection with the adding machine is a decided advantage in that it leaves one hand free for reference to books, bills, etc., and both when operated by hand and automatically, it is superior in speed, convenience and accuracy to the former method of laying a stack of cards on the table and elevating them with the fingers, an operation which often results in obtaining an incorrect total of all the items listed on the cards, since when hand manipulation is resorted to, the cohesive tendency of the cards, or an occasional rough edge, may result in more than one card being elevated at a time. With my device, the possibility of error from this source is eliminated as an adjustment is provided to accommodate different thicknesses of cards which permits only one card to be elevated at a time.

Figure 1 is a perspective view of my novel device, used in connection with an adding machine which is shown in dotted outline and with the device arranged for automatic operation by the adding machine, the device being shown supported on a table alongside the adding machine and illustrating the relation of parts with the handle at the end of forward stroke; Fig. 2 is a plan view of the device with certain parts broken away, showing the stack of cards in position to be engaged one by one by the lifter blade; Fig. 3 is a vertical section on the line 3—3 of Fig. 2 showing some of the cards in raised position; Fig. 4 is a fragmentary sectional view on the line 4—4 of Fig. 2, showing the lifter blade raised to display numbers on a card; Fig. 5 is a fragmentary section on the line 5—5 of Fig. 3 showing some of the cards in raised position on the supporting table with the overflow therefrom having dropped down behind the table; and Fig. 6 is a perspective view of the lifter blade.

The same reference characters indicate the same parts in all figures of the drawing.

Describing now more particularly the specific embodiment of my invention illustrated in the drawings, the base block 1 is fastened to a table in any suitable manner and in such relation to the adding machine as to conveniently permit adjustment of the operating connections of the two. The base block is inclined downwardly to the rear, to partly assist the rearward movement of a ticket-supporting carriage on its slide ways, and to improve the angle of visibility of numbers printed on the tickets. Secured to the base block is a sheet metal bed plate 2 having upstanding lugs $2^a$ supporting a longitudinal shaft 3 mounted to oscillate in the bearings of the lugs $2^a$, said shaft being prevented from longitudinal movement by the hub of a lifter blade pinned on the shaft immediately adjacent the center lug $2^a$, the rearward end of the shaft also having a flanged head to assist in preventing longitudinal movement. Slidably mounted on the shaft 3 is a ticket supporting carriage having end plates 5 and 6 connected by tie rods 7, 8 and 9, said carriage being supported by its end plates on the shaft 3 and by the tie rod 8 which rests in a slotted portion of an upturned lug 10 of the bed plate 2. The end plates 5 and 6 have notched projections $5^a$ and $6^a$ respectively, to support a stack of cards 11, whose perforations $11^a$ are engaged by a pin 12 which, with its stack of tickets, is inserted in the notched portions of the projections $5^a$ and $6^a$ of the end plates. The end plate 6 is provided on its rear side with a retaining spring 13, see Fig. 3, to prevent displacement of the pin 12, while the forward end of the pin is tapered to more readily engage the perforations of the tickets and extends beyond side frame 5, see Fig. 2. An offset upstanding lug $5^b$ of the side frame 5 prevents displacement of the pin longitudinally in a forward direction, the rearward end of the pin having an annular flange $12^a$ near its extremity to prevent rearward longitudinal movement.

A ticket lifter blade 4, pinned on the shaft 3, is yieldingly held in its normal lowered position by a spring $4^a$ fast at one end to a stud $4^b$ of the blade, and at its other end to a stud $2^b$ on the center lug $2^a$, see Figs. 3 and 4. A friction washer $12^b$, see Figs. 1 and 2, normally holds the stack of cards in compact arrangement.

A follower block in the form of a spring-propelled sliding frame 14 is slidably mounted on the tie rods 8 and 9 of the carriage, see Figs. 1 and 2, having extensions $14^a$ and $14^b$, engaging tie rods 8 and 9 respectively, both extensions $14^a$ and $14^b$ having circular openings to engage the tie rod 9 while the extension $14^a$ extends beyond the tie rod 9 downwardly and has a notched extremity $14^d$ to engage the tie rod 8 and thus prevent oscillation of the frame 14 about the tie rod 9. Said extension $14^a$ has a downwardly extending branch $14^c$, see Figs. 1 and 3, to which is fastened a spring 15 connected at its other end to a stud $2^b$ of the bed plate 2, see Fig. 2. A spring latch 16, supported in upturned lugs of the bed plate 2, see Figs. 1 and 2, has a shouldered cut-out portion $16^a$ to engage the underside of the extension $14^a$ of the sliding frame 14 when in rearward position (as shown in dotted lines in Fig. 2) to facilitate the placing of a stack of cards on the sliding carriage, the stack of cards 11 being supported at their free ends on the tie rod 9 and at the other end by the pin 12 in the notched portions $5^a$ and $6^a$ of the carriage. A stop pin $16^b$ is provided to limit the movement of the latch 16 about its fulcrum $16^d$.

When the cards are placed in position on the sliding ticket-supporting carriage, the finger piece $16^c$ of the latch 16 is pushed rearwardly to release the frame 14, which by the tension of its spring 15 is drawn rearwardly to press the stack of cards against the lifter blade 4. The lifter blade is notched at $4^c$ to clear the tie rod 9 and has an offset shoulder $4^d$ extending from its front side a distance equal to the thickness of one ticket, said shoulder when the blade is lowered, assumes a position directly beneath the next card to be raised. When the forward end of the lifter blade is oscillated to raise the ticket resting on the shoulder $4^d$, a beveled upper portion $4^e$ of the blade wipes past an inclined face $17^a$ of an oscillating ticket-supporting shelf 17 having a yoke-shaped base pivotally mounted on a stud 18 supported in lugs $19^a$ of a U-shaped bracket 19 fastened to the standard 2 by screws or any suitable manner, see Figs. 2 and 5. A spring 20 coiled around the stud 18 tends to restore the ticket-supporting shelf to its normal position, with its nose against an upstanding lug 21 formed upon a guide plate 24 to be hereinafter more fully described, when the lifter blade descends. When the lifter blade rises, lifting a ticket resting on its shoulder $4^d$ as described, the ticket forces back a spring 22, also mounted on the before mentioned guide plate 24 and arranged to yieldingly press any tickets on the shelf 17 rearwardly, see Figs. 1, 2 and 3, and as the blade returns to lowermost position under the influence of its spring $4^a$, the spring 22 frictionally retains the ticket in elevated position and forces it together with the body of preceding tickets rearwardly on top of said shelf to a point slightly to the rear of the front edge of the beveled top $4^e$ of the lifting blade. The camming action of the blade as it rises, and the tension of the spring 15 drawing the ticket carriage rearwardly also assists in shifting the body of tickets on the shelf 17 rearwardly. At each operation of the lifter blade, as the blade descends and a ticket is deposited upon the shelf 17, the tension of the spring 15 draws the frame 14, which bears against the end of the stack, rearwardly a distance equal to the thickness of one card, and consequently the ticket carriage moves rearwardly that distance. As the carriage thus travels rearwardly, a body of tickets accumulates upon the shelf 17, the foremost tickets on the shelf dropping or falling from the rear upper edge of such shelf back on to the tie rod 9 in the continued operation of the machine. The blade 4 is guided in its upward movement between two vertical guide lugs $2^c$ and $2^d$ of the bed plate 2, and to the lug $2^c$ is fastened in any suitable manner a vertically disposed guide plate 23, having an angular bent upper portion $23^a$, extending to the left and in a plane substantially parallel with and extending forwardly over the front edge of the body of raised cards on the shelf 17, said angular portion being designed to prevent overthrow of the tickets in rapid operation of the machine.

The other guide plate which is the guide plate 24 above mentioned, is secured to the upstanding lugs $2^d$ of the bed plate 2, and is provided with screw and slot adjustments $24^a$ to adjust the guide plate 24 for varying thicknesses of tickets. Adjustment of the plate 24 does not deflect the upward movement of the blade 4 from its vertical plane as said blade is guided between the stationary lugs $2^c$ and $2^d$. In the normal adjustment of the device the adjustable plate 24 is spaced from the forward upper face $4^f$ of the blade a distance equal to the thickness of one ticket and the upper part of the guide plate 24 is bent at an angle in a plane parallel to the upper edges of the lowered cards and immediately adjacent thereto. As before explained, the lug 21 is formed on the top portion of this guide plate and the spring 22 is mounted thereon. The rear edge of this angular or top portion of the plate 24 is cut away at $24^b$ (see Figs. 1 and 5) to permit free passage of the tickets, as it has been found in practice that the roughened upper corners of the cards had a tendency to fray or bend, and were liable to catch, and they otherwise would bind underneath the front top portion of the plate 24. It was also found to be a difficult matter to properly aline the inner guide face of the top portion of the plate 24, because of its length, and at times this resulted in one end of the top portion being spaced a thickness of more than one card from the blade while the other end might be in its proper spacing relation, a condition which sometimes resulted in the feeding of more than one card at a time. It will readily be seen that by shortening the alining edge of the plate by cutting it away at $24^b$, the tendency to imperfect alinement is materially diminished.

The means provided for automatic operation of the device by an adding machine and means for its manual operation are both illustrated in the drawings, see Figs. 1, 2 and 3. The means provided for automatic operation of the device as an incident to the operations of the adding machine include a crank arm 26 fast to a shaft 27 of the adding machine, which arm is rocked from a rearward position forwardly (opposite the direction indicated by the arrow in Fig. 1) on the forward stroke of the adding machine handle by means of connections comprising a crank 32 rocked by a shaft 31 to which the handle 30 is secured, a link 33 connected to a general operating cam (through which other movements are also effected), a rock shaft 35 to which said cam is secured, and to which is pinned a rock arm 36, and a link 37 connecting said arm 36 and a rock arm 38 on the shaft 27 before mentioned. A spring 39 serves to return the connected parts to normal position from the position shown in Fig. 1.

The crank arm 26 is equipped with a roller stud $26^a$ arranged to engage a slot $27^b$ formed in the intermediate portion of a lever 25 pivoted at $25^a$ to a downwardly projecting flange $2^f$ of the bed plate 2, the forward end of such lever being arranged to engage and lift the overhanging outer portion of the lifter blade 4 to the position shown in Fig. 1 as the adding machine handle is pulled forward. The reverse movement of the handle and connected parts permits the spring $4^a$ to restore the lifter blade to lower position. Excessive upward movement of the lever 25 is prevented by a headed screw stud $25^c$ carried by a downwardly extending lug 29 of the bed plate and arranged to engage a slot in a downward extension $25^d$ of such lever.

The means provided for manual operation of the device comprise a push lever 28 fastened to the shaft 3 by a set screw, said lever having a downwardly projecting stop finger $28^a$ which, when a card has been elevated to its raised position, brings up against a stud 29 on the lug $2^a$ provided for the purpose of limiting further movement. When the device is being operated manually by means of the push lever, it is disconnected by removing the roller stud 26ᵃ from the crank arm 26 or by merely shifting the device bodily sidewise away from the adding machine so that the stud 26ᵃ will not engage the sides of the slot 27ᵇ.

I claim:

1. In a card displaying device, a traveling carriage arranged to support cards arranged in a stack, the cards being pivotally mounted near one end in said carriage, and a vibrating shifting member mounted in stationary position and arranged to engage the free ends of the cards *seriatim* and successively shift them angularly into position of visibility.

2. In a card displaying device, a traveling carriage arranged to support cards arranged in a stack, the cards being pivotally mounted near one end in said carriage, and a vibrating lifter blade mounted in stationary position and having a front face formed with a shoulder arranged to engage the free ends of the cards *seriatim* and successively shift them angularly into position of visibility.

3. In a device for displaying cards similarly orificed at one end, a traveling carriage including a pivot rod arranged to engage the orifices of the cards and pivotally support them, and a vibrating shifting member arranged to engage the free ends of the cards *seriatim* and successively shift them angularly into position of visibility.

4. A card displaying device according to claim 3, in which the pivot rod is headed and equipped with an adjustable washer for retaining the cards in stack arrangement.

5. A card displaying device according to claim 3 in which the pivot rod is removable as a unit with cards engaged by it.

6. A card display device according to claim 3 in which the pivot rod is mounted in open yoke bearings and spring means are provided for yieldingly holding said rod against displacement.

7. In a card displaying device, a traveling carriage arranged to support cards arranged in a stack, the cards being pivotally mounted near one end in said carriage, a vibrating shifting member mounted in stationary position and arranged to engage the free ends of the cards *seriatim* and successively shift them angularly into position of visibility, and a stationary spring arranged to be wiped aside by each card when shifted and to frictionally restrain the engaged card from movement in a reverse direction.

8. In a card displaying device, a traveling carriage arranged to support cards arranged in a stack, the cards being pivotally mounted near one end in said carriage, a vibrating shifting member mounted in stationary position and arranged to engage the free ends of the cards *seriatim* and successively shift them angularly into position of visibility, and a supporting shelf mounted in stationary position arranged to receive and support the front ends of the cards in elevated position.

9. In a card displaying device, a traveling carriage arranged to support cards arranged in a stack, the cards being pivotally mounted near one end, a vibrating shifting member mounted in stationary position and arranged to engage the free ends of the cards *seriatim* and successively shift them angularly to position of visibility, a stationary plate having a vertical face adjacent and above the front end of the cards engaged by the shifting member and in a plane parallel with such card, and a vibrating supporting shelf mounted in stationary position and arranged to receive and support the front end of the cards in elevated position, said shelf being formed with a nose arranged to contact said stationary plate.

10. A card displaying device according to claim 9 in which the stationary plate is formed with a lateral extension overlying the front ends of the unelevated cards.

11. A card displaying device according to claim 9 in which the stationary plate is formed with a lateral extension overhanging the front ends of the unelevated cards and is cut away in the path of the front ends of the cards.

12. A card displaying device according to claim 9 in which the supporting face of the shelf is inclined downwardly from front to rear.

13. A card displaying device according to claim 9 in which the vibrating supporting shelf is an oscillating pivoted member.

14. A card displaying device according to claim 9 in which said stationary plate is adjustable toward and away from said vibrating shifting member to provide for feeding cards of different thickness.

15. In a card displaying device, a traveling carriage arranged to support cards arranged in a stack, the cards being pivotally mounted near one end, a vibrating lifter blade mounted in stationary position and having a front face formed with a shoulder arranged to engage the free ends of the cards *seriatim* and successively shift them angularly into position of visibility, a stationary plate having a vertical face adjacent and above the front end of the card engaged by the shoulder of said lifter blade, and a vibrating supporting shelf mounted in stationary position and arranged to receive and support the front end of the cards in elevated position, said shelf being formed with a nose arranged to contact said stationary plate.

16. A card displaying device according to claim 15 in which the upper edge of the lifter blade is formed with a beveled surface.

17. A card display device according to claim 15 in which the vibrating supporting shelf is a pivoted spring-pressed member and is arranged to be cammed aside by the lifter blade.

18. A card display device according to claim 15 in which the supporting face of the shelf is inclined downwardly from front to rear and in which the upper edge of the lifter blade is formed with a beveled surface adapted to wipe past said shelf and rock it rearwardly, whereby the cards thereon are worked rearwardly thereon.

19. In a card display device according to claim 15, a spring stationarily mounted above the level of said supporting shelf and yieldingly tending to shift an elevated card carried by the lifter blade rearwardly onto said shelf when said lifter blade descends.

20. In a device of the character described, a traveling carriage, a pivot rod on said carriage arranged to engage the orificed rear ends of a stack of cards, a vibrating lifter blade mounted on the machine frame, and a tensioned follower block slidingly mounted on said carriage and arranged to engage one end of said stack and yieldingly press the free ends of the cards toward and against said lifter blade, said lifter blade being formed with a shoulder arranged to engage and angularly shift said cards *seriatim* from the other end of said stack.

21. In a device of the character described, a traveling carriage, a pivot rod on said carriage arranged to engage the orificed rear ends of a stack of cards, a vibrating lifter blade mounted on the machine frame, a follower block slidingly mounted on said carriage and arranged to engage one end of said stack of cards, a spring connected to the machine frame and to said follower block to yieldingly press the free ends of the cards of said stack toward and against said lifter blade, said lifter blade being formed with a shoulder arranged to engage and angularly shift said cards *seriatim* from the other end of said stack.

22. A device of the character described and according to claim 21 provided with a spring tensioned by the shifting operation of the lifter blade and coöperative with such blade to restore it.

23. A device of the character described and according to claim 21 provided with a detent on the machine frame arranged to coöperate with said follower block at the limit of extension of said spring.

24. In a device of the character described, a rock shaft journaled in the frame of the machine, a traveling carriage slidingly mounted on said shaft and arranged to support cards arranged in a stack, the cards being pivotally mounted near one end, a lifter blade secured to said rock shaft and arranged to engage the free ends of the cards *seriatim* and successively shift them angularly into position of visibility, and means for rocking said rock shaft.

25. In a device of the character described and adapted to be used in connection with an adding machine, a rock shaft journaled in the frame of the machine, a traveling carriage slidingly mounted on said rod and arranged to support cards arranged in a stack, the cards being pivotally mounted near one end, a lifter blade secured to said rock shaft and arranged to engage the free ends of the cards *seriatim* and successively shift them angularly into position of visibility, and means for rocking said rock shaft as an incident to the operation of the adding machine.

26. In a device of the character described, a traveling carriage including end plates and tie rods, a pivot rod supported on said carriage arranged to engage the orificed rear ends of a stack of cards, a vibrating lifter blade mounted on the machine frame, and a follower block slidingly mounted on said tie rods and arranged to engage one end of said stack and yieldingly press the free ends of the cards toward and against said lifter blade, said lifter blade being formed with a shoulder arranged to engage and angularly shift said cards *seriatim* from the other end of said stack.

27. A card displaying device according to claim 26 in which the follower block is in the form of a U-shaped metal member having side members at least one of which engages two tie rods of the carriage.

28. A card displaying device according to claim 26 in which the free ends of the unshifted cards are supported by a tie rod of the carriage.

29. In a device of the character described and adapted to be used in connection with an adding machine having a vibrating actuating handle, a traveling carriage arranged to support cards arranged in a stack, a vibrating shifting member mounted in stationary position and arranged to engage the cards *seriatim* and successively shift them into position of visibility, and means connected with the adding machine for vibrating said shifting member synchronously with the strokes of the handle of such machine.

30. In a device of the character described and adapted to be used in connection with an adding machine having a vibrating actuating handle, a traveling carriage arranged to support cards arranged in a stack, a vibrating shifting member mounted in stationary position and arranged to engage the cards *seriatim* and successively shift them into position of visibility, and means connected with the adding machine for vibrating said shifting member to expose a card upon the forward stroke of the handle of such machine.

31. In a device of the character described and adapted to be used in connection with an adding machine, a traveling carriage arranged to support cards arranged in a stack, a vibrating lifter blade mounted in stationary position and arranged to engage the cards *seriatim* and successively shift them into position of visibility, and means for shifting said lifter blade including a pivoted lever operatively connected with the adding machine and coöperating with the lifter blade to elevate it.

32. In a device of the character described and adapted to be used in connection with an adding machine having a vibrating actuating handle, a traveling carriage arranged to support cards arranged in a stack, a vibrating lifter blade mounted in stationary position and arranged to engage the cards *seriatim* and successively shift them into position of visibility, and means for shifting said lifter blade to elevate a card upon the forward stroke of the handle of the adding machine including a rock shaft connected with said handle, a crank carried by said rock shaft and a pivoted lever actuated by said crank and coöperating with said lifter blade.

FRANK C. RINSCHE.